United States Patent [19]

Asanuma et al.

[11] Patent Number: 5,172,317
[45] Date of Patent: Dec. 15, 1992

[54] AUTOMATIC TRAVELLING APPARATUS

[75] Inventors: Nobuyoshi Asanuma; Shinnosuke Ishida; Hiroshi Hasegawa, all of Saitama, Japan

[73] Assignee: Honda Giken Kogyo Kabushiki Kaisha, Tokyo, Japan

[21] Appl. No.: 873,638

[22] Filed: Apr. 23, 1992

Related U.S. Application Data

[63] Continuation of Ser. No. 755,604, Sep. 4, 1991, abandoned, which is a continuation of Ser. No. 392,259, Aug. 10, 1989, abandoned.

[30] Foreign Application Priority Data

Aug. 10, 1988 [JP] Japan ................. 63-199611
Aug. 10, 1988 [JP] Japan ................. 63-199613

[51] Int. Cl.$^5$ ............................... G06F 15/50
[52] U.S. Cl. .................. 364/424.02; 180/169
[58] Field of Search .......... 364/424.01, 424.02; 180/168, 169; 358/103

[56] References Cited

U.S. PATENT DOCUMENTS

| | | | |
|---|---|---|---|
| 4,530,057 | 7/1985 | Ahlbom | 364/424.02 |
| 4,630,109 | 12/1986 | Barton | 364/424.02 |
| 4,731,860 | 3/1988 | Wahl | 382/41 |
| 4,815,008 | 3/1989 | Kadonoff et al. | 364/513 |
| 4,817,000 | 3/1989 | Eberhardt | 364/424.02 |
| 4,821,192 | 4/1989 | Taivalkoski et al. | 364/424.02 |
| 4,868,752 | 9/1989 | Fujii et al. | 364/424.02 |
| 4,970,653 | 11/1990 | Kenue | 364/461 |

OTHER PUBLICATIONS

"Road Boundary Detection for Autonomous Vehicle Navigation", by Larry S. Davis et al., Optical Engineering, Mar. 1986.

"Image Processing for Visible Navigation of Roadways", by Jacqueline Le Moigne et al., Jul. 1985.

Primary Examiner—Thomas G. Black
Attorney, Agent, or Firm—Lyon & Lyon

[57] ABSTRACT

An automatic travelling apparatus which permits: determination of a permissible travelling area on the basis of images taken by an image pickup device or video camera, showing the sight of the area appearing ahead of the vehicle; steering control of the vehicle to go into a target course in the permissible travelling area; and selection of a predetermined way of a selected crossing or branch in the target course.

For the image pickup device or video camera taking images of the area extending ahead of the vehicle for determining a permissible travelling area, a wide-angle camera, a telescopic range camera and an ordinary camera are selectively used to meet particular situations for example, taking pictures of a crossing, zigzag way or straight long way. This selective use of cameras of different characteristics permits correct identification of particular roads with those stored in the map storage.

5 Claims, 7 Drawing Sheets

FIG. 5
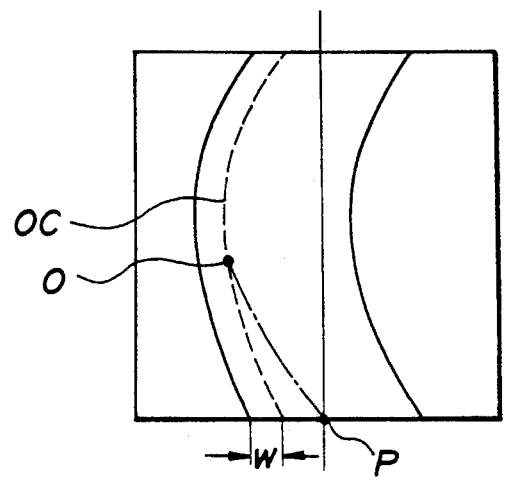
FIG. 6(a)    FIG. 6(b)
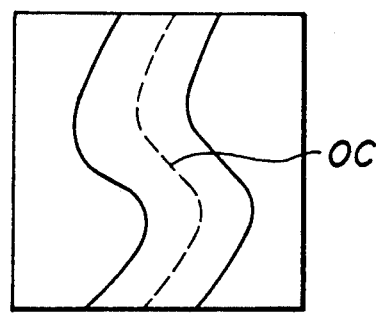 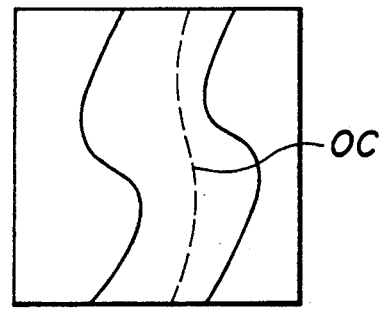

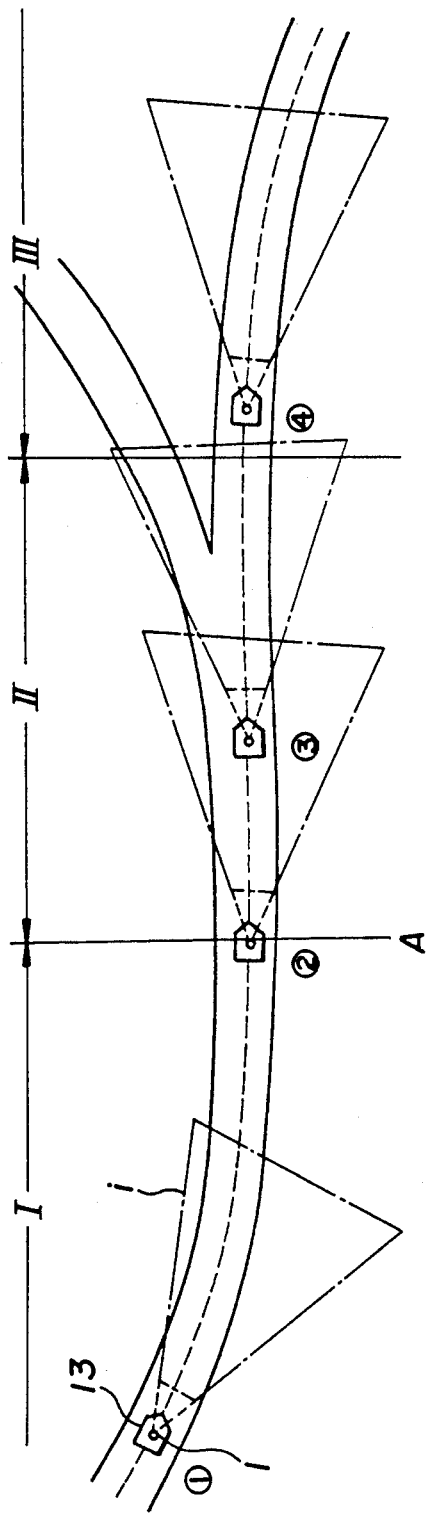
FIG. 9
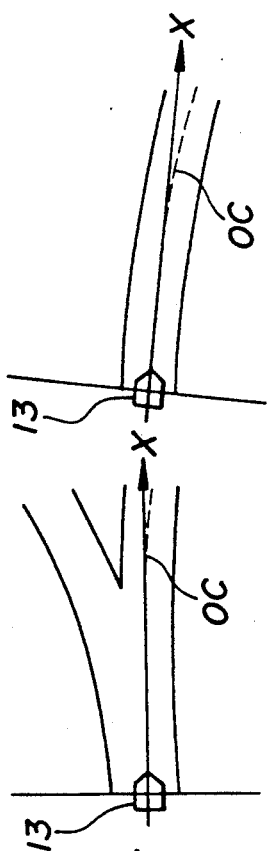
FIG.10(d)
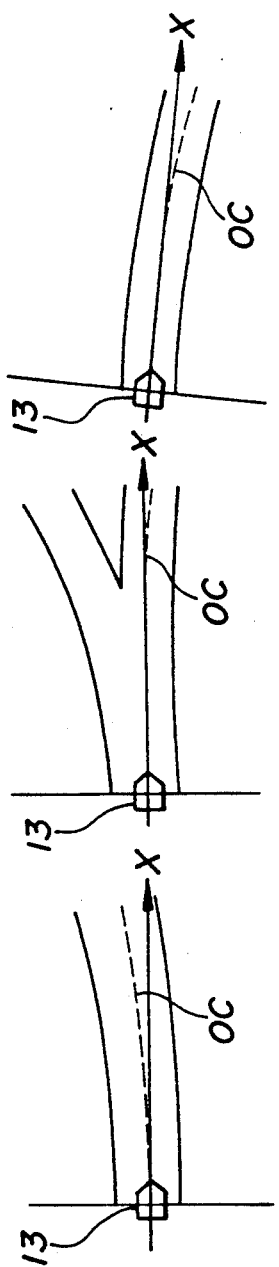
FIG.10(c)
FIG.10(b)
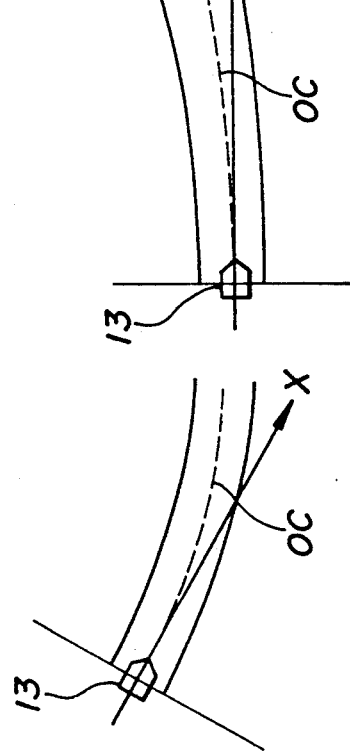
FIG.10(a)

AUTOMATIC TRAVELLING APPARATUS

This is a continuation of co-pending application Ser. No. 07/755,604, filed on Sep. 4,1991, now abandoned which is continuation application, or Ser. No. 392,259 filed on Aug. 10, 1989, now abandoned.

BACKGROUND OF THE INVENTION

1. Field of the Invention

The present invention relates to automatic travelling apparatus in which a vehicle determines a path to follow on road.

2. Description of the Prior Art

A conventional automatic travelling system uses an image pickup device attached to a vehicle to steer the vehicle, thereby permitting it to follow a guide line which is laid on the road (See Japanese Patent Publication No. 58-42482 and Japanese Patent Application Public Disclosure No. 62-140109).

Apparently, such an automatic travelling system is useless on the road having no guide line.

Another example of automatic travelling system is an automatic power lawn mower equipped with an image pickup device such as a video camera. While continuously taking images of the lawn area ahead of the mower, these images are treated to enhance the difference of shade between the finished and unfinished areas, thereby permitting exact detection of the boundary between the finished and unfinished areas. The mower is steered to travel along the boundary thus detected (See Japanese Patent Application Public Disclosure No. 62-70916).

This automatic travelling system is capable of determining a course to follow, but this automatic travelling system is essentially the same as the first automatic travelling system described above in respect of that the vehicle follows a single guide line on the road.

When a vehicle is running on the road, an appropriate path to follow on the road should be determined by taking the width of the road and the running speed of the vehicle into consideration.

SUMMARY OF THE INVENTION

One object of the present invention is to provide an automatic travelling apparatus which is capable of automatically determining an appropriate course in the road and steering the vehicle to follow the course thus determined.

The central feature of the present invention is to steer a vehicle so as to permit the vehicle to select and take an indicated way of a crossing or branch of a road to follow.

The automatic travelling apparatus uses an image pickup device or video camera for taking the images of the road extending ahead of the vehicle, thereby permitting the vehicle to follow a course set appropriately in the road, and the image-taking characteristics of the image pickup device or video camera are selected among wide-angle, telescopic range and ordinary range cameras depending on what kind of road the vehicle is running, crossing, straight road or zigzag road.

An automatic travelling apparatus according to a first aspect of the present invention comprises: an image pickup device or video camera attached to a vehicle: means for presetting course informations as to which way of a crossing or branch the vehicle takes; means responsive to detection of a crossing or branch appearing ahead of the vehicle for outputting relevant course information; means for identifying the crossing or branch appearing ahead of the vehicle on the basis of images taken by the image pickup device or video camera and showing the sight of the area extending ahead of the vehicle; and means for reading the relevant course informations outputted and controlling the vehicle with reference to the informations of the identified crossing or branch so as to permit the vehicle to take the indicated way of the crossing or branch.

An automatic travelling apparatus according to a second aspect of the present invention comprises: an image pickup device or video camera attached to a vehicle for taking images of the area extending ahead of the vehicle; means for identifying the road with reference to the images taken by the image pickup device or video camera; means for steering the vehicle so as to permit the vehicle to follow the identified road; means for setting informations indicating the particulars of roads to follow; means responsive to detection of a particular road for outputting relevant informations; and means for selecting the characteristics of the image pickup device or video camera with reference to the information outputted.

Other objects and advantages of the present invention will be understood from the following description of an automatic travelling apparatus according to a preferred embodiment of the present invention which is shown in accompanying drawings:

FIG. 5 shows one example of a target course set in the road;

FIG. 6 (a) shows one example of a target course set in the road for a vehicle running at a decreased speed;

FIG. 6 (b) shows one example of a target course set in the road for a vehicle running at an increased speed;

FIG. 9 shows the manner in which a vehicle is travelling toward a Y-branch;

Figure 11:
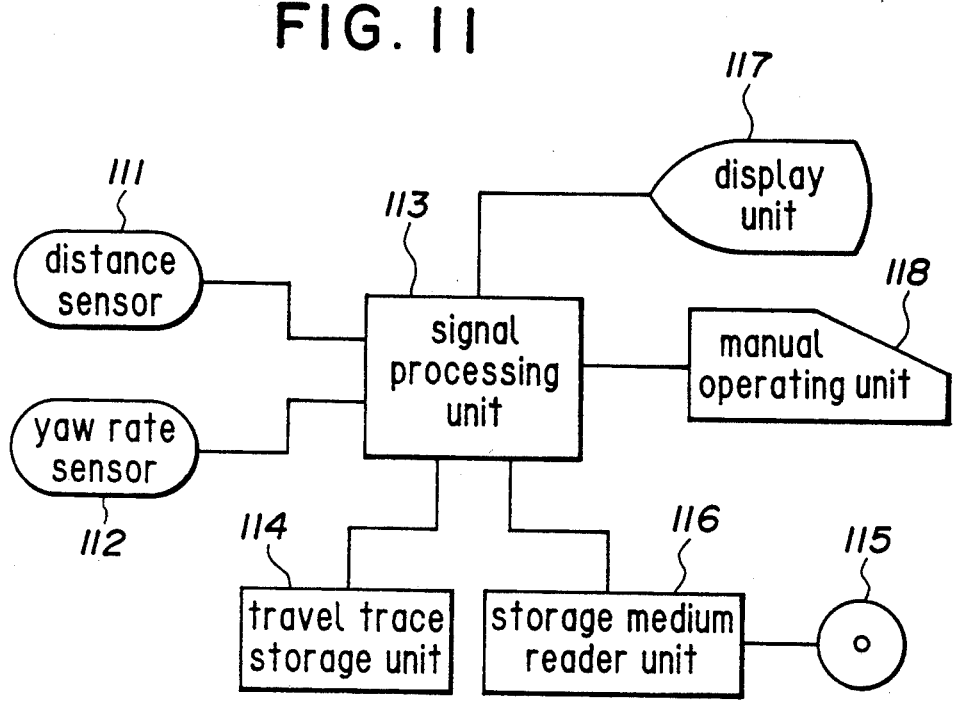
Figure 12:
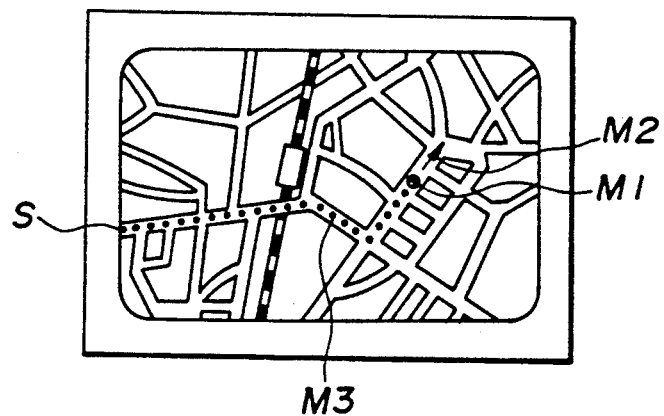
Figure 13:
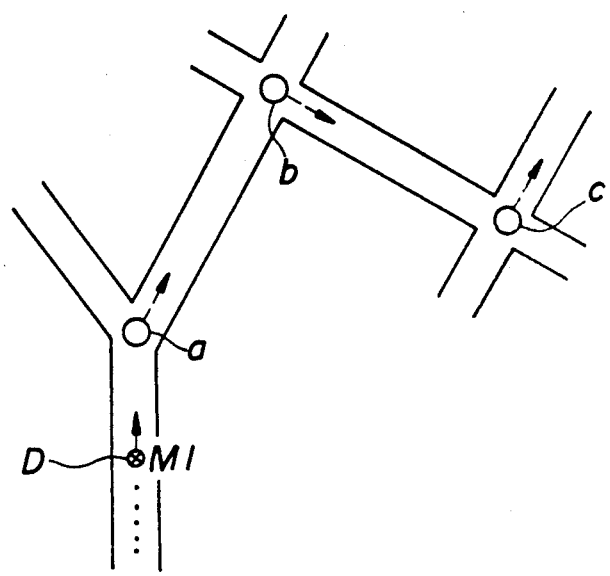
Figure 14:
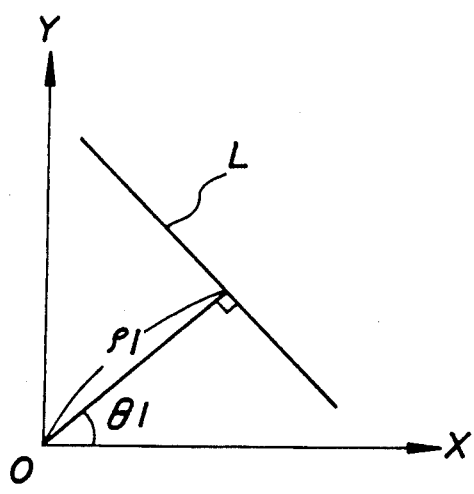

FIGS. 10 (a) to 10 (d) show different travelling controls in different sections corresponding to those of FIG. 9;

FIG. 11 is a block diagram showing a travelling system;

FIG. 12 shows one example of image appearing on the screen of a display unit;

FIG. 13 shows what marks appear on the screen of the display unit when travelling commands are inputted;

FIG. 14 shows a line L appearing in the X-Y coordinates; and

Figure 15:
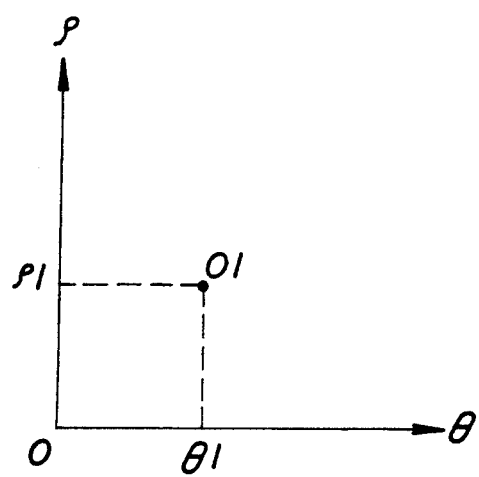

FIG. 15 shows a point appearing on the $p$-$\theta$ coordinates when the line L in FIG. 14 is subjected to the Hough conversion.

Figure 1:
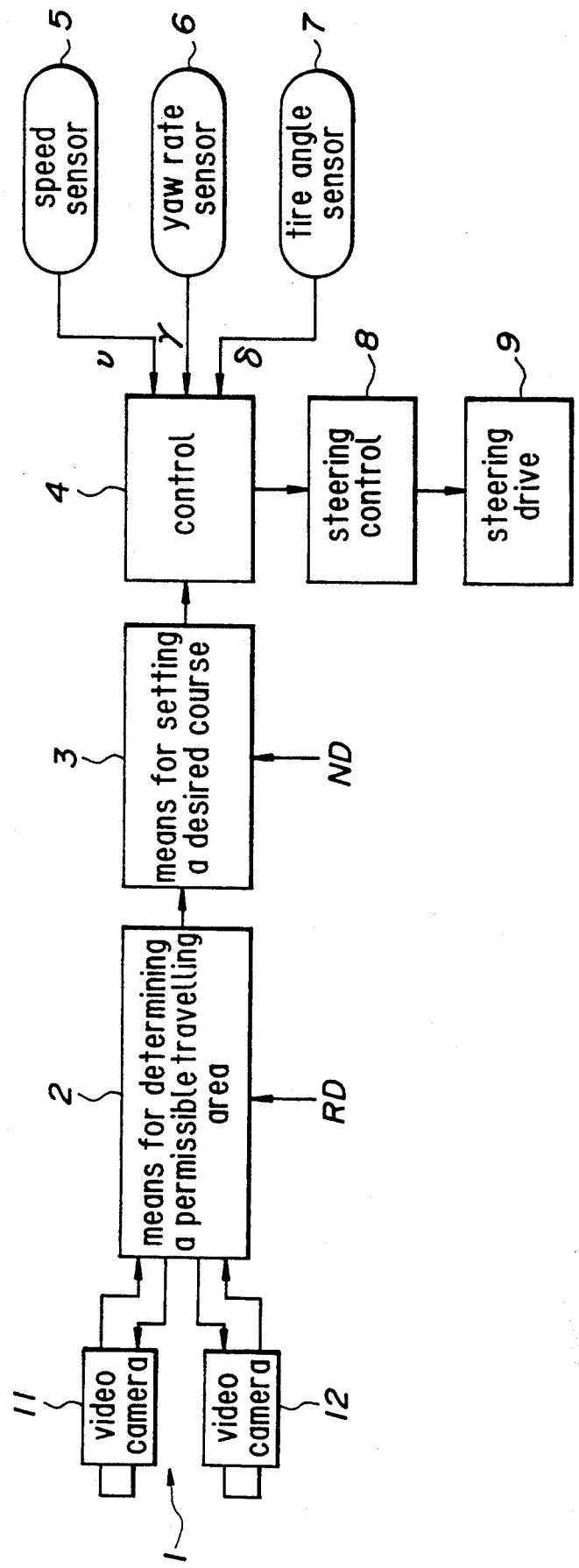
FIG. 1 is a block diagram of an automatic travelling apparatus according to one embodiment of the present invention.

As shown in FIG. 1, an automatic travelling apparatus according to the present invention comprises: an image pickup device such as video cameras $1_1$ and $1_2$ attached to a vehicle for continuously picking up subsequent images of ground ahead of the vehicle; means 2 for processing the images taken by the video cameras and determining a permissible travelling area such as a road in the direction in which the vehicle is to travel; means 3 for setting a target course in the permissible travelling area thus determined; means 4 for determining the instantaneous running condition of the vehicle on the basis of an output signal from a speed sensor 5 representing the running speed "v" of the vehicle, an output signal from a yaw rate sensor 6 representing the yaw rate or angular velocity increment in yawing direction, and an output signal from a tire angle sensor 7 representing the tire angle $\delta$ which varies with the steering of the vehicle, and for estimating, on the basis of the instantaneous running condition, a steering amount to permit the vehicle to follow the target course; and means 8 (and a steerage drive 9) for steering the vehicle with reference to the steering amount.

Actually, a computer aided control is used in place of means 2, 3 and 4, and means 8 can be included in the computer aided control, if occasions demand.

Figure 2:
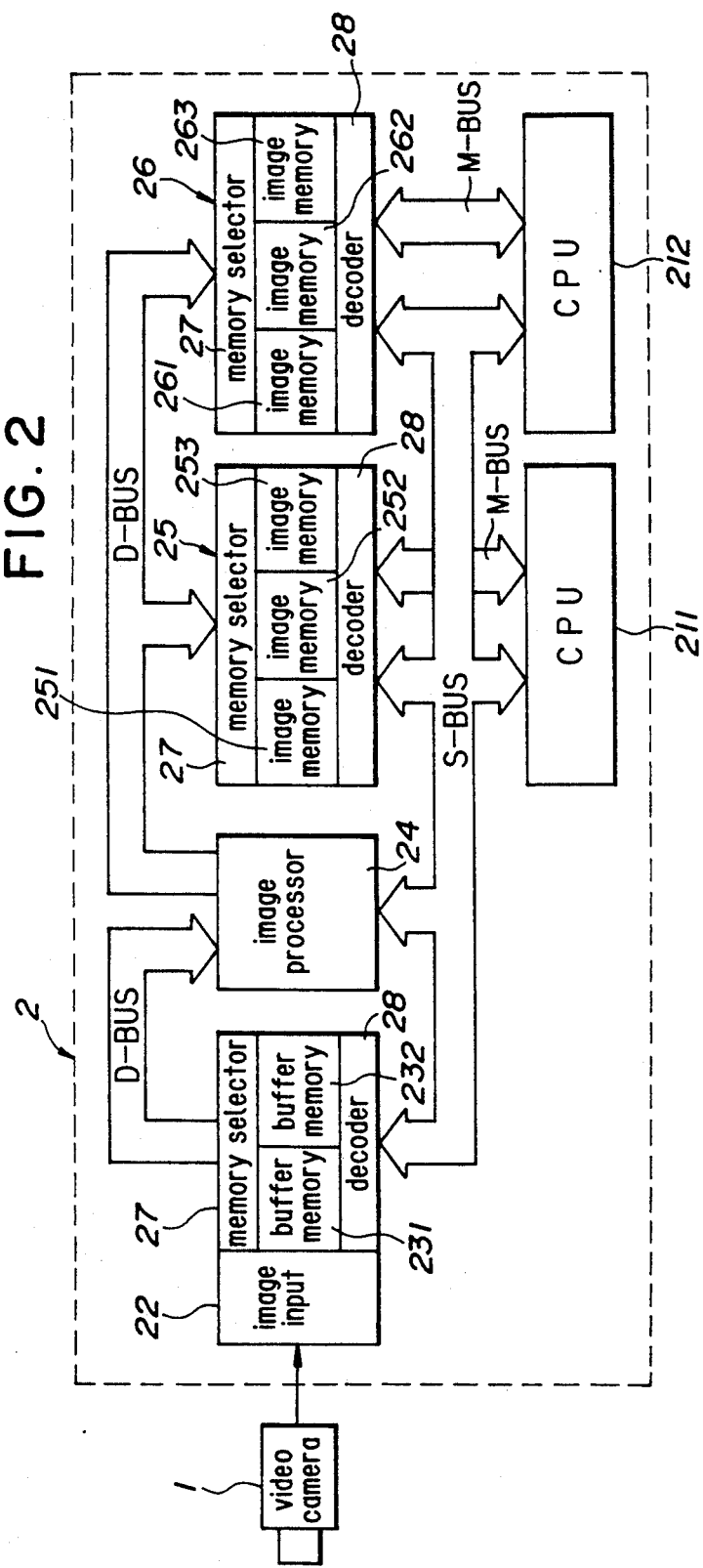
FIG. 2 is a block diagram of permissible area determining means.

FIG. 2 shows the structure of the permissible travelling area determining means 2 as comprising: first stage including image input 22, buffer memories $23_1$, $23_2$, memory selector 27 and decoder 28; second stage including image processor 24 connected to memory selector 27 of the first stage via D-bus (high-speed data bus); third stage including memory selector 25, image memories $25_1$, $25_2$ and $25_3$ and decoder 28; fourth stage including memory selector 27, image memories $26_1$, $26_2$ and $26_3$ and decoder 28, memory selectors 25 and 26 of the third and fourth stages being connected to the image processor 24 via D-bus; first and second CPUs 211 and 212 both connected to decoders 28 of the first, third and fourth stages via S-bus (system bus) and connected to decoders 28 of the third and fourth stages via M-bus (high-speed memory access bus).

In operation a series of image signals each representing a single image are supplied from the video cameras $1_1$, $1_2$ to the image input of the first stage, and then these image signals are stored alternately in the buffer memories $23_1$ and $23_2$ under the control of the CPUs 211 and 212. Then, these image informations are shifted to the image processor 24 one after another, where they are subjected to image processing, thereby detecting road edges in images if any, and determining a permissible travelling area as later described in detail. The image informations pertaining to permissible travelling areas are supplied to a group of image memories $25_1$, $25_2$ and $25_3$ or a group of image memories $26_1$, $26_2$ and $26_3$. Then, the contents of these memories are renewed by these latest image informations pertaining to permissible travelling areas. Thus, a series of image informations pertaining to subsequent permissible travelling areas, over a predetermined distance which the vehicle runs, are stored in either memory group. The contents of either memory group 25 or 26 are transferred to means 3 for setting a target course in the permissible travelling area.

Parallel installations of two CPUs 211 and 212 and two buffer memories 231 and 232 permit alternate retrieval or storage of image informations to either buffer memory, as for example follows: while first image information stored in the buffer memory 231 are read under the control of the CPU 211, subsequent image informations are stored in the buffer memory 232 under the control of the CPU 212. Thus, the inputting of image information can be carried out on the real time basis.

Likewise, parallel installation of two groups of image memories 25 and 26 permit alternate retrieval or storage of image information to either memory group on the real time basis.

The determination of a permissible travelling area can be made as follows:

First, each image supplied from the video cameras will be subjected to differentiation process, and road edges if any, will be detected. Then, an automatic threshold setting circuit in the permissible travelling area detection means 2 sets a threshold value in consideration of road the degree of shade of the image information just processed. The road edge image will be subjected to binary transformation.

Alternately, first, the images may be subjected to binary transformation, and then the binary data may be subjected to differentiation. In place of binary transformation poly-digitization may be performed to express some shade details of image.

Figure 3:
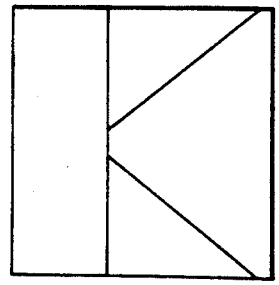
FIG. 3 shows one example of road determined from images taken by a video camera of a vehicle.
Figure 7:
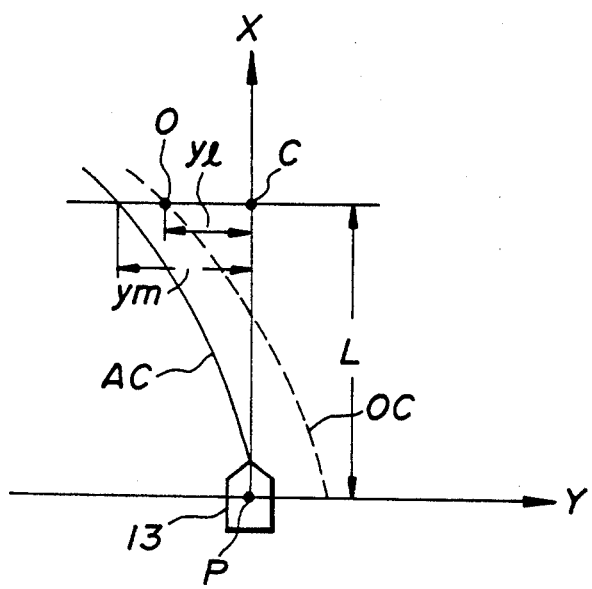
FIG. 7 shows the relation between a target course and a presumed course.

The digitalized image information will be subjected to the Hough (such as suggested in U.S. Pat. No. 3,069,654, Paul V. C. Hough, inventor) conversion to convert the X-Y linear coordinates to the corresponding $\rho$-$\theta$ point coordinates, thus eliminating isolated points and plotting to provide a continuous road edge image as shown in FIG. 3.

$\theta$ stands for an angle formed between the X-axis and a normal line extending from the origin of the X-Y coordinates perpendicular to the line, whereas $\rho$ stands for the length of the normal line. For instance, the line L in the X-Y coordinates in FIG. 14 is expressed as the point 01 in the $\rho$-$\theta$ point coordinates in FIG. 15.

Figure 4:
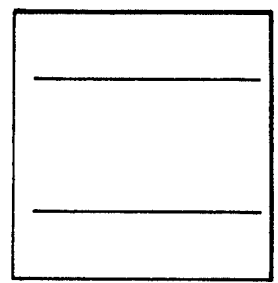
FIG. 4 shows an image resulting from the projection transformation of the image of FIG. 3.

The image taken by a video camera represents a perspective view. The perspective road edge image as shown in FIG. 3 can be converted to non-perspective road edge image as shown in FIG. 4 according to the projection conversion process. The area between contiguous road edges is a permissible travelling area.

After a permissible travelling area is determined by the permissible travelling area determining means 2, the target course setting means 3 will select a course most appropriate for running in the permissible travelling area, and will set the so selected course as a target course to follow.

Preferably, the course may be determined in consideration of the road contour and the running speed of the vehicle to meet the instantaneous travelling condition of the vehicle. However, the course may be basically determined in consideration of the width of the road as follows:

In case that the target course setting means 3 finds that the width of the road is above a predetermined extent, and that vehicles must keep to the left, a target course OC will be set a given constant distance "W" (for instance, 1.5 meters) apart from the left edge of the road, as shown in FIG. 5.

In case that the width of the road is below the predetermined extent, a target course will be set along the center line of the road.

As the vehicle is running, the contents of the memories of the target course setting means 3 are renewed, and the coordinates of the target course are continuously stored therein. The divisions of the X-Y coordinates are selected in compliance with the magnification of the video camera.

In FIG. 5 the current or instantaneous vehicle position is indicated at "P", and the video camera may be placed so as to permit the point "P" to appear at the center, lower point of the display screen. The trace of the vehicle from "P" to "0" represents the course actually followed by the vehicle under the control of the control 4 until the vehicle has come to the target course at point 0.

Also, it is possible to set a target course in consideration of the running condition of the vehicle as follows:

In case that the target course setting means 3 finds that the running speed measured by the speed sensor 5 is below a predetermined speed, the target course will be set in conformity with the road contour as seen from FIG. 6a.

When the running speed of the vehicle is higher than a predetermined speed, and when the vehicle is running a curved road as shown in FIG. 6b, a target course of reduced curvature OC is set so as to reduce the lateral force which is applied to the vehicle.

After setting a target course in the road, the control 4 will estimate a steering amount to permit the vehicle to follow the target course as follows:

Assume that a vehicle 17 at Point "P" is controlled to get on the target course OC.

First the distance L(m) (L=v×T) on the X-axis which the vehicle can run in T seconds will be determined on the basis of the running speed of the vehicle v (m/s), which is determined by the speed sensor. Then, the lateral deviation y1 from Point "C" (on which the vehicle would be in T seconds if it travelled straight along the X-axis) to the target course OC will be estimated.

Second, the course AC which the vehicle is supposed to follow, will be estimated from the yaw rate T (rad/sec), and then, the lateral deviation ym from Point "C" to the presumed course will be estimated by the following equation:

$$ym = (-v \times T^2/2) \times T \quad (1)$$

The positive sign of yaw rate T represents that the presumed course turns to the left whereas the negative sign of yaw rate T represents that the presumed course turns to the right.

The yaw rate T' to which the yaw rate of the vehicle is to be corrected will be determined from the following equation:

$$\delta' = \delta + (T'/v) \times W(1 + Kv^2) \quad (3)$$

where "W" stands for wheelbase, "K" is a constant which is determined both from the tire characteristics and the vehicle characteristics.

The steering control 8 is responsive to the steering amount δ' from the control 4 for issuing a drive command to the steerage drive 9, thereby causing the steerage drive 9 to steer the vehicle towards the target course.

The setting of the distance L on the X-axis may vary with the running speed of the vehicle under the control of the control 4. In particular, the distance L on the X-axis may decrease with the decrease of the running speed v of the vehicle, accordingly reducing the distance which the vehicle runs before getting on the target course OC, causing the vehicle to get on the target course OC as quickly as possible.

In case that the vehicle is running in a curved path, the distance L may decrease with the decrease of the curvature of the curved path, thereby causing the vehicle to get on the target course as quickly as possible.

A predetermined course pattern for a vehicle to follow from Point "P" to Point "O" on the target course may be advantageously used. This course pattern may be modified by a course factor which may be determined from the distance "L" and the running speed v to meet the particular situation. The vehicle can get on the target course smoothly by following the modified course pattern from Point "P" to Point "O" on the target course.

One example of the course pattern is given by y=x−sin x, and another example is given by y=x³.

Figure 8:
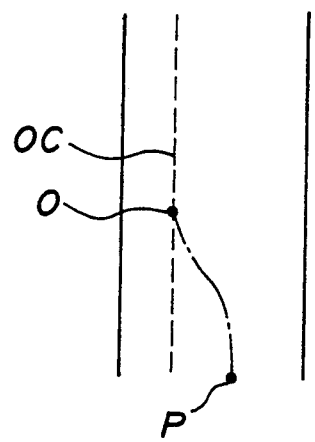
FIG. 8 shows one example of course which the vehicle follows when a vehicle puts itself on a target course.

FIG. 8 shows a course pattern represented by y=x−sin x.

The processes described above are repeated at every interval of several seconds to permit the vehicle to run along the target course automatically.

An automatic travelling apparatus according to the present invention is capable of determining the road edge from images taken by the image pickup device or video camera and showing the sight of the area extending ahead of a running vehicle; making a search for a permissible travelling area on the basis of the so determined road edge; setting a target course in the permissible travelling area; determining on the basis of the instantaneous running condition of the vehicle, a steering amount by which the vehicle must be controlled to go into the target course; and controlling the vehicle in terms of the steering amount.

The automatic travelling apparatus uses a two-stage course determination in which first, a target course is set in a permissible travelling area, and then a tentative course is determined to follow before the vehicle goes into the target course, thereby improving the accuracy with which the automatic travelling can be performed.

The target course setting means 3 of the automatic travelling apparatus shown in FIG. 1 is responsive to signals representing travelling information ND from a travelling system (See FIG. 11) for example, as to which way of a crossing the vehicle should take, for setting a target course OC most appropriate for the situation as follows:

The target course setting means 3 sets a target course OC in response to signals ND from a travelling system (See FIG. 11) informing a car for example, which way of a Y-branch the vehicle must take as follows: Referring to FIG. 9, the vehicle is approaching to a Y-branch.

While the vehicle is running in an ordinary travelling area of relatively narrow width I in FIG. 9, a target course OC is set on the center line of the travelling area, as shown in FIG. 10(a).

In FIG. 9 each triangular area i (broken lines) indicates the area whose image can be taken by a video camera 1 of the vehicle 13.

When the vehicle is approaching to a Y-branch as indicated by II in FIG. 9, the travelling system having necessary travelling informations inputted therein, will send a command ND such as "Take the right way of the Y-branch appearing ahead of the car." to the target course setting means 3 at the time when the vehicle has come to Position A a predetermined distance apart from the Y-branch. According to the command from the travelling system the target course setting means 3 sets a target course OC gradually approaching from Position A to the right way as shown in FIG. 10(b). When the video camera catches the sight of the Y-branch ahead, the target course setting means 3 sets a target course OC extending in the right way of the Y-branch.

After the vehicle runs in the right way of the Y-branch, and after the vehicle enters an ordinary travelling area of relatively narrow width indicated at III in FIG. 9, the target course setting means 3 returns to the ordinary operation, setting a target course OC on the center line of the way.

The part (1) in FIG. 9 corresponds to FIG. 10(a); the part (2) in FIG. 9 corresponds to FIG. 10(b); the part (3) in FIG. 9 corresponds to FIG. 10(c) and the part (4) in FIG. 9 corresponds to FIG. 10(d).

FIG. 11 shows a travelling system as comprising distance sensor 111, yaw rate sensor 112, signal processing unit 113, travel path storage unit 114, map storage medium 115, storage medium reader unit 116, display unit 117, and operating unit 118. A photoelectric distance measuring unit which is capable of generating a pulse signal per unit travelling distance in response to rotation of the tires of a vehicle, an electro magnetic type of distance measuring unit or a mechanical contact type of distance measuring unit may be used as a distance sensor 111. The yaw rate sensor 112 may comprise a gyroscope which is capable of generating a signal representing the angular velocity increment in the yaw direction while the vehicle is running. The signal processing unit 113 (computor-aided control) includes a CPU, ROMs for programming, RAMs for controlling etc. The CPU is capable of counting pulse signals from the distance sensor 111 to determine the travelling distance; determining the change of travelling direction from signals from the yaw rate sensor 112; estimating on the basis of these variables thus determined, the instantaneous position of the vehicle on the X-Y coordinates every time the vehicle has run a unit distance. The travel path storage unit 114 is capable of storing instantaneous car position data from the signal processing unit 113. The map storage medium 115 has digitalized map information stored in the form of files. The storage medium reader unit 116 selectively reads necessary map information from the map storage medium 115. The display unit 117 shows a map thus retrieved from the storage medium, and at the same time, the travel path of the vehicle, the instantaneous position of the vehicle and the direction in which the vehicle is presumed to travel on the map. The operation unit 118 permits selection of map to be displayed, setting of the start position in the map appearing on the screen of the display unit, and inputting of selected commands from the travelling system for guiding the vehicle along a target course on the map.

As best seen from FIG. 12, a selective map appears on the screen of the display unit 117. In the map a first mark M1 indicates the instantaneous position of the vehicle on the X-Y coordinates (the instantaneous position on the X-Y coordinates being determined from the travelling distance from the start position times the reducing scale factor of the map); a second mark M2 indicates the direction in which the vehicle is going; and a series of third marks M3 indicate the trace of the vehicle.

When the operating unit 118 is operated to input travelling commands ND to the target course setting means 3 to permit the vehicle to follow a target course in the map appearing on the screen of the display unit, points a, b and c can be put in the map to indicate particular crossings or branches, and then commands such as "Turn to the left." or "Turn to the right" can be given when the vehicle is approaching such a point in the map.

The signal processing unit 113 reads each travelling command to issue an appropriate command ND for example, "Take the right way of the Y-branch appearing ahead of the vehicle." at the time when the instantaneous position mark M1 has come to be a given constant distance D apart to the point a.

Alternatively, in place of inputting travelling commands as described above, a departing point and an arrival point on the map are inputted and indicated, and then a possible shortest course on short cut from the departing point to the arrival point can be automatically determined by computer processing in the travelling system. In this case when the vehicle is coming close to a crossing or branch on the so determined course, a signal representing a necessary travelling information ND indicating which way of the crossing or branch the vehicle must take, will be sent to the automatic travelling apparatus.

A telescopic range camera 11 and a wide-angle camera 12 are included in a video camera system fixed to a vehicle, and these cameras selectively used under the control of the permissible travelling area determining means 2 in response to a signal RD representing the characteristics of road, such as crossing, branch, straight road, zigzag road etc.

The travelling system permits the setting of a selected course on a map appearing on the screen of the display and the inputting of road information RD pertaining to the kinds of road such as crossing, branch, straight road, zigzag road etc. When the vehicle is approaching an indicated crossing for example, the relevant road information will be outputted.

Once a departing point and ann arrival point have been inputted and set in a map which appears on the screen of the display, a possible shortest course from the departing point to the arrival point can be automatically determined by computer processing in the travelling system.

The permissible travelling area determining means 2 is responsive to a signal RD representing a crossing from the travelling system for selecting the wide-angle camera 12 to make a search for the indicated crossing by sweeping over the relatively wide range. When the permissible travelling area determining means 2 receives a signal RD representing a straight road from the travelling system, the telescopic range camera 11 will be selected to have a possible distant sight of the straight road. When the permissible travelling area determining means 2 receives a signal RD representing a zigzag road from the travelling system, thw wide-angle camera 12 will be again selected to have a full sight of the zigzag road.

Also, a telescopic range camera having a zooming capability may be advantageously used for moving from a distant to close-up view of an elongated straight road.

When the instantaneous vehicle position mark M1 is a predetermined distance D apart from a marked point "a", the signal processing unit 113 permits a voicing apparatus (now shown) for example, to inform a driver of necessary oral command by uttering for example, "Take the right way of the Y-branch appearing ahead of the vehicle.", and at the same time, the signal processing unit 113 gives the road information of the Y-branch to the permissible travelling area determining means 2.

In place of using the operating unit 118 to select particular crossings or branches in a selected travelling course, and in place of inputting informations RD pertaining to the road characteristics of the selected crossings or branches, map informations and other necessary informations RD pertaining to locations and road characteristics of selected crossings or branches may be stored in the map information storing medium, and when a vehicle mark representing the instantaneous position in the map which appears on the screen of the display, approaches such a selected crossing or branch, necessary informations may be retrieved from the map information storing medium, and supplied to the permissible travelling area determining means 2 under the control of the signal processing unit 113.

It is not necessary to equip the travelling system with a distance sensor 111 because the speed sensor 5 of the automatic travelling apparatus shown in FIG. 1 may be used to estimate the distance which the vehicle has run. Also, it is not necessary to equip the travelling system with a yaw rate sensor 112 because the yaw rate sensor 6 of the automatic travelling apparatus shown in FIG. 1 may be used in common.

As may be understood from the above, an automatic travelling apparatus according to the present invention permits determination of permissible travelling area on the basis of images taken by an image pickup device or video camera, showing the sight of the area appearing ahead of the vehicle; steering control of the vehicle to go into a target course in the permissible travelling area; and selection of a predetermined way of a selected crossing or branch in the target course. These complicated determination and control can be easily performed without fail.

Also, when an image pickup device or video camera take images of the area extending ahead of the vehicle for determining a permissible travelling area, a wide-angle camera, a telescopic range camera and an ordinary camera are selectively used to meet particular situations for example, taking pictures of a crossing, zigzag way or straight long way. This selective use of cameras of different characteristics permits correct identification of particular roads with those stored in the map storage.

What is claimed is:

1. An automatic travelling apparatus for a vehicle, comprising: an image pickup device attached to the vehicle; means for presetting course information as to which way of a cross or branch in a road travelled by the vehicle that the vehicle shall take; means responsive to detection of a crossing or branch appearing ahead of the vehicle for outputting relevant course information; means for identifying the crossing or branch appearing ahead of the vehicle on the basis of images taken by the image pickup device and showing the sight of the area extending ahead of the vehicle; and means for reading the relevant course information outputted and controlling the vehicle with reference to the information of the identified crossing or branch so as to permit the vehicle to take the preset course of the crossing or branch in the road.

2. An automatic travelling apparatus for a vehicle, comprising: an image pickup device attached to the vehicle for taking images of the area extending ahead of the vehicle; means for identifying the road with reference to the images taken by the image pickup device; means for steering the vehicle so as to permit the running vehicle to follow the identified road; means for setting information indicating particulars of roads to follow; means responsive to detection of a particular road for outputting relevant information; and means for selecting an image-taking characteristic of the image pickup device with reference to the information outputted.

3. An automatic travelling apparatus according to claim 2 wherein roads to follow include crossings, branches straight roads.

4. An automatic travelling apparatus according to claim 2 wherein the image-taking characteristics of the image pickup device is at least one of wide-angle, telescopic range and ordinary.

5. A method for automatically controlling the travel of a vehicle along a road comprising the steps of:
   detecting images of an area extending ahead of the vehicle;
   presetting course information as to a desired direction of a crossing or branch in the road travelled by the vehicle that the vehicle is desired to take;
   detecting a crossing or branch appearing ahead of the vehicle;
   identifying the crossing or branch in the road appearing ahead of the vehicle on a basis of images detected and showing the sight of the area extending ahead of the vehicle; and
   reading the relevant course information outputted and controlling the vehicle with reference to the information of the identifying crossing or branch so as to permit the vehicle to take the desired direction of the crossing or branch in the road.

* * * * *